US009757700B2

(12) United States Patent
Pozzan et al.

(10) Patent No.: US 9,757,700 B2
(45) Date of Patent: Sep. 12, 2017

(54) STIRRER FOR STABILIZING LIQUID BINDING UNFINISHED PRODUCTS INTENDED TO FORM CERAMIC ITEMS

(71) Applicant: CER GROUP S.R.L., Vicenza (IT)

(72) Inventors: Andrea Pozzan, Vicenza (IT); Leonardo Pozzan, Vicenza (IT); Pietro Posenato, Vicenza (IT)

(73) Assignee: CER GROUP S.R.L., Vicenza (IT)

( * ) Notice: Subject to any disclaimer, the term of this patent is extended or adjusted under 35 U.S.C. 154(b) by 358 days.

(21) Appl. No.: 14/405,756

(22) PCT Filed: May 23, 2013

(86) PCT No.: PCT/IB2013/054277
§ 371 (c)(1),
(2) Date: Dec. 4, 2014

(87) PCT Pub. No.: WO2013/182943
PCT Pub. Date: Dec. 12, 2013

(65) Prior Publication Data
US 2015/0117138 A1    Apr. 30, 2015

(30) Foreign Application Priority Data
Jun. 5, 2012   (IT) .............................. PD2012A0180

(51) Int. Cl.
*B01F 7/18*         (2006.01)
*B01F 15/06*        (2006.01)
(Continued)

(52) U.S. Cl.
CPC ............ *B01F 15/068* (2013.01); *B01F 7/001* (2013.01); *B01F 7/003* (2013.01);
(Continued)

(58) Field of Classification Search
CPC ................................. B01F 7/18; B01F 15/068
(Continued)

(56) References Cited

U.S. PATENT DOCUMENTS 70,518 A * 11/1867 Bush ..................... B01F 15/068
                                                                165/92
3,168,431 A * 2/1965 Spielvogel ............... C12C 7/22
                                                                159/25.2
2005/0232071 A1* 10/2005 Matsumoto ............. B01F 5/104
                                                                366/136

FOREIGN PATENT DOCUMENTS

CA        2506286 A1   11/2006
DE        2916310 A1   10/1980
(Continued)

*Primary Examiner* — David Sorkin
(74) *Attorney, Agent, or Firm* — Hedman & Costigan, P.C.; James V. Costigan; Kathleen A. Costigan

(57) ABSTRACT

A stirrer (1; 100) for stabilizing liquid binding unfinished products intended to form ceramic items comprising a support shaft (2) individuating a longitudinal rotation axis (Y) and contained into a mixing tank (V) of the liquid binding unfinished product, motorization means (3) operatively connected with the support shaft (2) in order to rotate it around the longitudinal axis (Y), and a main operating blade (4), coupled with the support shaft (2) through interconnection means (5) in such a way as to be contained into the mixing tank (V) in order to interfere with the liquid binding unfinished product and cause its continuous mechanical mixing action inside the mixing tank (V) itself when the support shaft (2) rotates around the longitudinal axis (Y). In this case, the stirrer (1) includes a thermoregulation circuit (6), which extends within the support shaft (2) and within the main operating blade (4) and is connected with an external source for supplying a heat transfer fluid crossing the thermoregulation circuit (6) in such a way as to exchange heat with the liquid binding unfinished product (Continued)

within the mixing tank (V), in order to bring the it to a predefined temperature, while the support shaft (2) and the main operating blade (4) integral with it rotate around the longitudinal axis (Y).

15 Claims, 9 Drawing Sheets

(51) Int. Cl.

| | | |
|---|---|---|
| *B01F 7/00* | (2006.01) | |
| *B28C 5/46* | (2006.01) | |
| *B28C 1/02* | (2006.01) | |
| *B28C 5/08* | (2006.01) | |
| *B28C 5/12* | (2006.01) | |
| *B28C 5/16* | (2006.01) | |
| *B01F 15/00* | (2006.01) | |

(52) U.S. Cl.
CPC ...... *B01F 7/00133* (2013.01); *B01F 7/00141* (2013.01); *B01F 7/00725* (2013.01); *B01F 7/18* (2013.01); *B28C 1/02* (2013.01); *B28C 5/0831* (2013.01); *B28C 5/1215* (2013.01); *B28C 5/166* (2013.01); *B28C 5/46* (2013.01); *B01F 15/00681* (2013.01); *B01F 2015/0011* (2013.01); *B01F 2015/00623* (2013.01); *B01F 2015/062* (2013.01); *Y02P 40/63* (2015.11)

(58) Field of Classification Search
USPC ........................................ 366/145; 165/109.1
See application file for complete search history.

(56) References Cited

FOREIGN PATENT DOCUMENTS

| | | |
|---|---|---|
| JP | H04-74536 U | 6/1992 |
| JP | 07-008780 A | 1/1995 |
| JP | 2002-095946 A | 4/2002 |
| JP | 2003-117376 A | 4/2003 |
| WO | 2010/006565 A1 | 1/2010 |

* cited by examiner

US 9,757,700 B2

STIRRER FOR STABILIZING LIQUID BINDING UNFINISHED PRODUCTS INTENDED TO FORM CERAMIC ITEMS

The present invention relates to a stirrer for stabilizing liquid binding unfinished products, such as typically and illustratively:

a mixture mainly composed of water and clays, rather viscous and with creamy consistency (more commonly known in the jargon with the term of slurry), intended for casting for forming ceramic articles such as sanitary fixtures, flooring tiles, dishes, decorative materials and items and so on;

a mixture mainly of water composed, kaolin and feldspar, rather viscous and with creamy consistency (more commonly known in jargon with the term of ceramic enamel) intended for spraying coating of ceramic articles for example sanitary fixtures, floor tiles, dishes, decorative materials and items and so on.

Such liquid binding unfinished products are firstly subjected to a preliminary processing of thermoregulation in a usually cylindrical or octagonal mixing tank, made for example of stainless steel, to which the stirrer of the invention is properly and operatively associated. ft should be immediately noted that hereinafter in the current description with the term of thermoregulation (or conditioning) it is meant to encompass any operation of thermal treatment of the liquid binding unfinished product, such as heating (temperatures typically in the range of 30-40° C.), or cooling (typically at a temperature below the ambient temperature) of the latter, depending on the processing that should be performed downstream the operation that is performed in the mixing tank by using the stabilization stirrer of the invention.

It should be noted, furthermore, that in the present description the term "stabilization" indicates the effect resulting from the combination of the mixing processing and the thermoregulation treatment which the stirrer of the invention carries on the liquid binding unfinished product.

As known, the production of ceramic articles, such as sanitary bowls for toilet, provides, among numerous operational steps, the operation of stabilizing a liquid binding unfinished product suitably prepared in the dose and composition chosen, where "stabilization" means the thermal-mechanical treatment with which the liquid binding unfinished product reaches the desired and designed temperature and consistency conditions.

According to the prior art, stabilization operation takes place in special mixing tanks (or basins)—having capacity ranging from relatively low values (for example 5 $m^3$) to far more significant values (even up to 75 $m^3$) and a cylindrical or octagonal shape—by using mixing devices (commonly called stirrers) coupled with the mixing tank at the closing lid thereof.

A traditional known stirrer, such as that one of document CA2506286 A1, includes a support shaft defining a longitudinal rotation axis and mainly inserted into the foregoing mixing tank of the liquid binding unfinished product, as well as motorization means operatively connected with the support shaft in order to rotate it around such a longitudinal axis.

A common stirrer of the known art also comprises a main operating blade coupled through interconnection means with the support shaft in such a manner that, in application conditions, the main operating blade itself is contained into the mixing tank in order to interfere with the liquid binding unfinished product and cause a continuous mechanical mixing action thereof, when the support shaft rotates around such a longitudinal axis. The modern stirrer of the prior art thus described in its essential features, when operating in combination with a mixing tank, therefore, allows to undergo the liquid binding unfinished product inside the mixing tank to a mechanical mixing action useful to give the liquid unfinished product the desired consistency and density.

Evidently, such a mechanical mixing action, produced by the rotation of the operating blade around the longitudinal axis of the support shaft, it's not by itself able to confer the necessary physical-chemical properties to the liquid binding unfinished product, suitable to the subsequent working steps, since such liquid binding unfinished product must also reach a predefined and proper temperature, at the end of the stabilization phase in the mixing tank. For this purpose, the known technique of the sector concerned provides the use of thermoregulation means, cooperating closely with the liquid binding unfinished product contained into the mixing tank.

Traditionally and conventionally, the thermoregulation means comprise a classical coil, crossed by a heat exchange fluid (usually water) and coupled directly with the mixing tank: in some constructive solutions, the coil is fixed to the inner side wall of the mixing tank, while, in other constructive solutions, the coil is fixed at the inner bottom of the mixing tank. In this way, it is possible to intervene, yet in the stabilization phase in the mixing tank, the temperature of the liquid binding unfinished product, bringing it to the appropriate value for the subsequent working steps.

However, the current operative situation linked to the stabilization of liquid binding unfinished products intended to form common ceramic items presents some recognized and evident drawbacks.

More specifically, a first drawback of the prior art concerned is constituted by the fact that the matching to the mixing tank of the thermoregulation systems complicates and makes rather articulated the production of the tank itself, with the consequent always unwanted increase of manufacturing times and costs (obviously, manpower and raw materials used being equal).

A second drawback, in some ways much more significant than that one indicated just above, is determined by the fact that the thermoregulation means, as currently designed in the field of relevance concerned, represent a static system of heat transmission, since fixed internally to the mixing tank.

Now, it is well known that the heat is a transfer of energy between two bodies in contact or close together that are initially at different temperatures, and that the temperature is a measure of the average kinetic energy of the molecules of a body, kinetic energy which is regulated by the mathematical formula $$Ec = \tfrac{1}{2} mv^2$$

where:

m=mass of the body, v=speed of the body, it is evident that the thermoregulation means used for stabilizing a liquid binding unfinished product intended to form ceramic items such as sanitary fixtures, do not operate with optimum efficiency and require a supply of power electricity in order to bring the temperature of the liquid binding unfinished product to the value desired which, as it tries to contain, can still be widely minimized or otherwise reduced.

In substance, therefore, it is currently necessary to provide in the time unit a relevant quantity of electricity so that the thermoregulation means effectively fulfill their function on the liquid binding unfinished product.

It follows thus that, in the current state of the art, times and costs required to thermally stabilize a liquid binding unfinished product, contained into a mixing tank and intended to form a ceramic item, are not the optimal ones, just depending on the electrical power absorbed by thermoregulation means.

Another drawback of the known technique here concerned derives from the fact that some liquid binding unfinished products which ceramic items are realized with, typically clay-based, for example, the slurry firstly introduced eventually significantly adhere to the thermoregulation means facing the inner volume of the mixing tank, thus forming an insulating layer that limits at a non-negligible extent thermoregulation means efficiency.

A further drawback of the prior art is due to the fact that the current systems of stabilization of a semi liquid binding unfinished product intended to form ceramic items end to render excessively liquid the binding unfinished product itself, creating in it anisotropy phenomena which, in turn, may cause problems in the subsequent processing steps (e.g. mold casting). Starting, therefore, from the recognition of the foregoing drawbacks of the current state of the art, the present invention proposes to give them accomplished remedy.

In particular, primary purpose of the present invention is to provide a stirrer for stabilizing liquid binding unfinished products intended to form ceramic items, which, in general term, allows to simplify compared to the prior art the construction conception of the thermoregulation system of the aforementioned liquid binding unfinished products contained into a mixing tank.

In the cognitive sphere of this purpose, it is task of the invention to make concrete a stirrer for stabilizing liquid binding unfinished products intended to form ceramic items that, manpower and raw materials used being equal, allows to reduce manufacturing time and cost of the appliances properly used for such a stabilization operation.

It is a second purpose of the invention to maximize, or at least make more efficient than equivalent systems of known type, the efficiency of the appliances, in particular the thermoregulation system, used for the stabilization of liquid binding unfinished products intended to form ceramic items.

In other words, it is a purpose of the present invention to achieve over the prior art energy savings in the effective processing of liquid binding unfinished products intended to form ceramic items—duration of the processing cycle being equal—or, alternatively, to reduce compared to the known art time required to achieve effective processing of liquid binding unfinished products intended to form ceramic items—electric power supplied, especially in relation to the operation of the means/system thermoregulation, being equal—.

It is a further purpose of the invention to develop a stirrer for stabilizing liquid binding unfinished products intended to form ceramic items which allows to keep the initial functional efficiency of the thermoregulation system unchanged over time or in any case for periods longer than those one which can be currently found.

It is a last but not least purpose of the present invention to devise a stirrer for stabilizing liquid binding unfinished products intended to form ceramic items such that the onset of anisotropy phenomena for the liquid binding unfinished products processed or treated by it, causing processing problems in the subsequent working step (for instance mold casting), is substantially avoided or greatly limited compared to the known art comparable to it. Said purposes are achieved by means of a stirrer for stabilizing liquid binding unfinished products intended to form ceramic items as to the annexed claim 1, as hereinafter referred for the sake of exhibition brevity.

Further technical features of detail of the stirrer of the invention are contained in the corresponding dependent claims.

The above-mentioned claims, hereinafter specifically and concretely defined, are considered an integral part of the present description.

Advantageously, the stirrer of the invention globally allows to simplify compared to the known art the constructive conception of the thermoregulation system of liquid binding unfinished products contained into a mixing tank: this by virtue of the fact that the thermoregulation circuit is already integrated and made rigidly coupled with the support shaft and main operating blade of the stirrer of the invention and, as a consequence, it is not necessary to provide any costly fixing operation of the thermoregulation circuit to the mixing tank, as it happens with the appliances currently used to stabilize liquid binding unfinished products intended to the casting for forming sanitary fixtures.

Still advantageously, the stirrer for stabilizing liquid binding unfinished products intended to form ceramic items, which is the object of the invention described herein, presents an efficiency optimal or at least better than known systems with which, in the prior art, the thermoregulation of these liquid binding unfinished products contained into a mixing tank is obtained.

Such an aspect directly comes from the fact that in the invention, the thermoregulation circuit is integral with the support shaft and main operating blade and, therefore, it moves with these constructive components of the stirrer: in application and operating conditions of the stirrer of the invention, support shaft and main operating blade operating form thermoregulating (heating or cooling, depending ort the case) surfaces in motion.

Consequently, since, as seen above, the kinetic energy of a moving body is directly proportional to the square of the speed, the liquid binding unfinished product present in a mixing tank is brought to the desired temperature, useful to the subsequent working steps, in shorter time than those ones allowed by an apparatus (including stirrer and mixing tank) of known type, the electric power absorbed to supply the thermoregulation circuit being equal.

Equally advantageously, therefore, in the stirrer of the invention the thermoregulation circuit is capable of transferring in short time to the liquid binding unfinished product a high amount of heat, considerably higher than that one transferred by the known systems, avoiding wasteful time transitions to allow accumulation of thermal energy in the thermoregulation circuit (phenomenon of thermal inertia) and reach a given and suitable temperature.

In advantageous manner, furthermore, the dynamic, not static, feature of the thermoregulation circuit allows the stirrer of the present invention to avoid the phenomena typical of the prior art according to which the liquid binding unfinished product, present inside the mixing tank and intended to form ceramic items, eventually adheres to the thermoregulation circuit, forming a damaging thermal insulation layer.

The stirrer of the invention thus allows to keep unchanged over time the efficiency of the initial functional thermoregulation circuit, or in any case for a time much longer than that one provided by the prior equivalent technological solutions, compared to which the invention also restricts the burdensome and inconvenient maintenance and/or replacement interventions.

Further features and specificities of the invention will appear to a greater extent from the description that follows, relating to a preferred embodiment of the stirrer object of the present industrial sole-right, given by purely indicative and illustrative, but not limiting, way in relation to the accompanying drawings in which.

Figure 1:
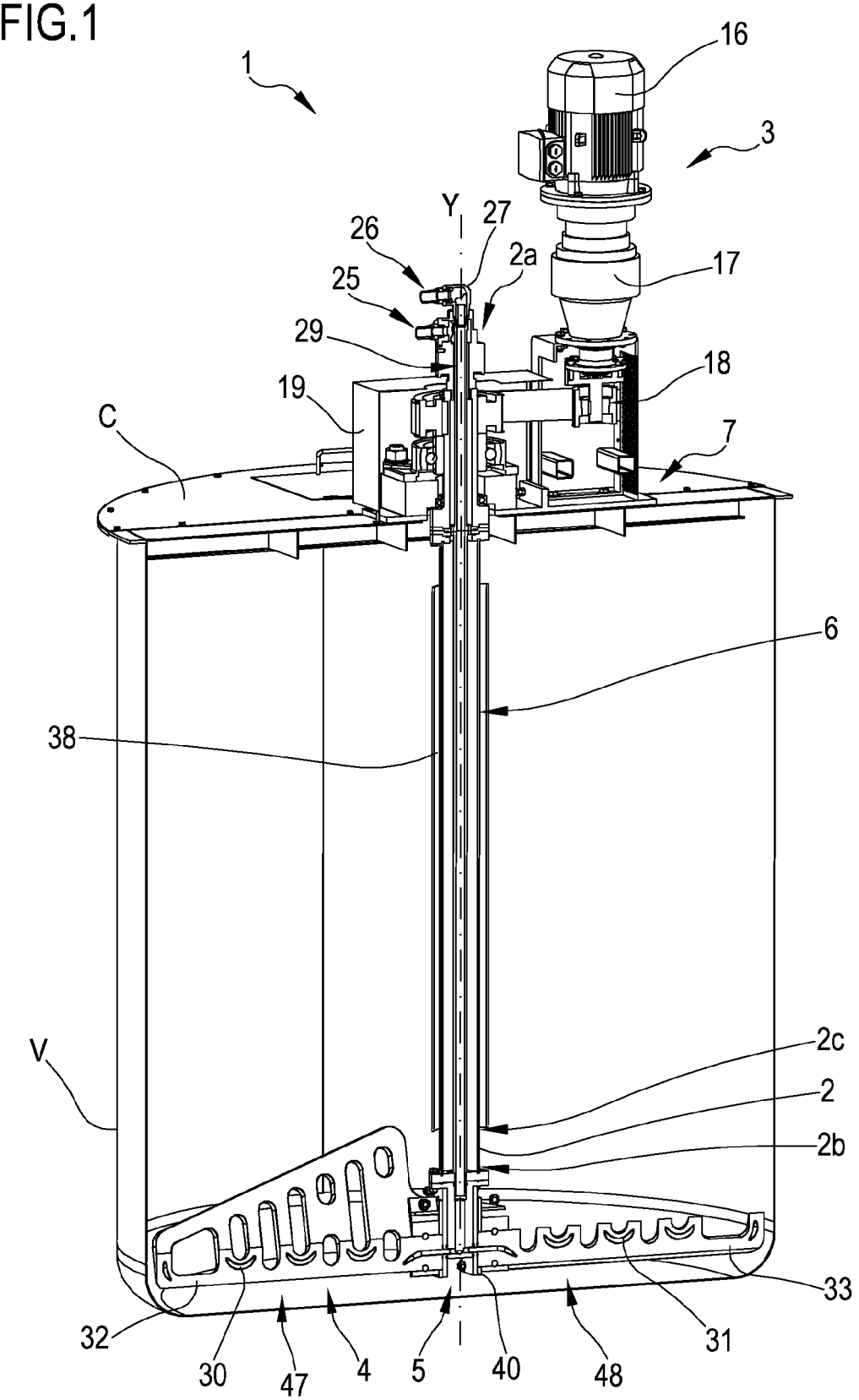
FIG. 1 is a sectioned and partly truncated assonometric view of the stirrer of the invention in application conditions.

The stirrer of the invention, used for stabilizing liquid binding unfinished products intended to form ceramic items, is illustrated in application conditions in FIG. 1, where it is generally indicated with 1.

As it can be seen, the stirrer 1 includes:

a support shaft 2 which defines a longitudinal rotation axis Y and which, in this specific case, is internally hollow and is almost completely contained into a mixing tank V of the liquid binding unfinished product, not visible and constituted for example by a mixture of water and clay (slurry);

motorization means, overall indicated with 3, operatively connected with the support shaft 2 in order to set it rotating around the longitudinal axis Y;

a main operating blade 4, coupled with the support shaft 2 through interconnection means, generally indicated with 5, in such a way as to be contained into the mixing tank V in order to interfere with the liquid binding unfinished product and cause a continuous mechanical mixing action thereof, inside the mixing tank V, when the support shaft 2 rotates around the longitudinal axis Y as a result to the actuation of the motorization means 3.

In accordance with the invention, the stirrer 1 includes a thermoregulation circuit, as a whole reported with 6, which extends inside the support shaft 2 and main operating blade 4 and is connected with an external source, not shown, for supplying a heat transfer fluid crossing the thermoregulation circuit 6 in such a way as to exchange heat with the liquid binding unfinished product inside the mixing tank V, in order to bring the liquid binding unfinished product itself to a predefined temperature, while the support shaft 2 and with it, the main operating blade 4 rotate around the longitudinal axis Y.

In essence, therefore, in the stirrer 1 of the invention the thermoregulation circuit 6 is rigidly coupled with the movable components, in particular the support shaft 2 and the main operating blade 4.

It is briefly pointed out that the mixing tank V, made for example of stainless steel, has, in a purely preferred and not binding way, a cylindrical shape and a bottom plate F; it may typically have a volumetric capacity of $5\pm15$ m$^3$ and a minimum thickness of 6 mm.

Furthermore, the external source of supply of the transfer fluid of heat exchange can be properly represented by the water system, a heating circuit (if it is necessary to heat the liquid binding unfinished product), a chiller (if it is necessary to cool the liquid binding unfinished product), a well, a small boiler of service that makes the stirrer and the apparatus as a whole independent.

In all these cases the heat transfer fluid circulating inside the thermoregulation circuit 6 may be water or other suitable fluids, such as for instance diathermic oil, glycolic water and so on. The support shaft 2 and the motorization means 3 are designed in such a way as to be fixed externally and above the cover C of the mixing tank V through anchoring means, as a whole indicated with 7 and which, preferably, include a base plate 8, suitable to be fixed directly to the cover C, a centering block 9, arranged above the base plate 8, and a flanged support 10 arranged above the centering block 9.

The components of the anchoring means 7 just defined are held together by coupling pins 11 and nuts 12 and have a respective through hole 13, 14 and 15 through which the support shaft 2 passes (therefore, the three through holes 13, 14 and 15 are coaxial each other along the longitudinal axis Y of the support shaft 2).

As far as the motorization means 3 are include, which include, by way of example, a three-phase asynchronous electric motor 16 and a gear 17 coupled thereto, they are operatively connected with the support shaft 2 through transmission means, as a whole indicated with 18 and suitable to be arranged superiorly outside the mixing tank V, properly protected by a box-shaped casing 19 that prevents easy or accidental, and therefore extremely dangerous access, thereof.

Preferably but not necessarily, the transmission means 18 comprise in this case a first toothed pulley 20, arranged above the support flange 10 and still coupled with the support shaft 2 through locking key 21, and a second toothed pulley 22, coupled with a drive shaft 23 belonging to the motorization means 3 and mechanically connected with the first toothed pulley 20 by means of a toothed belt 24.

Figure 3:
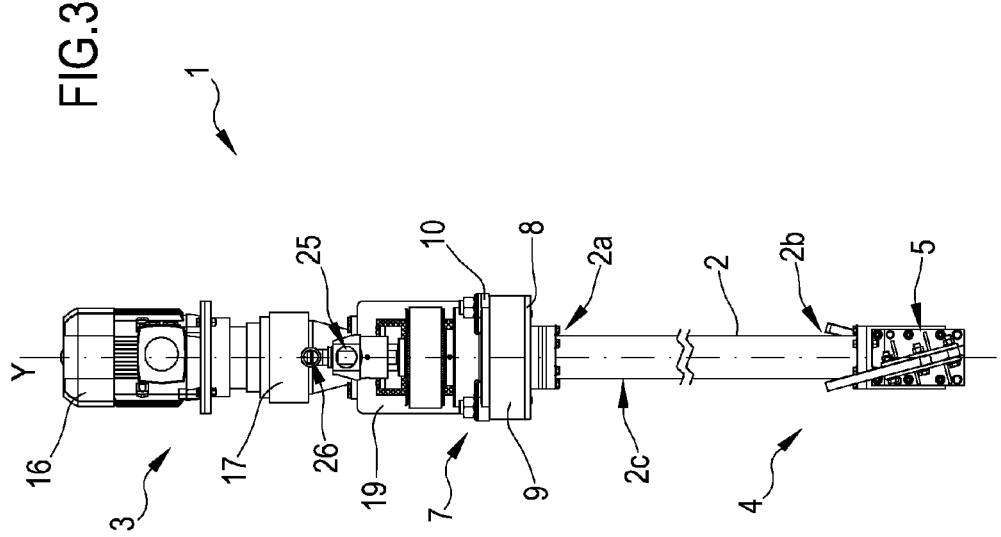
FIG. 3 is a side view of the stirrer of FIG. 1.
Figure 2:
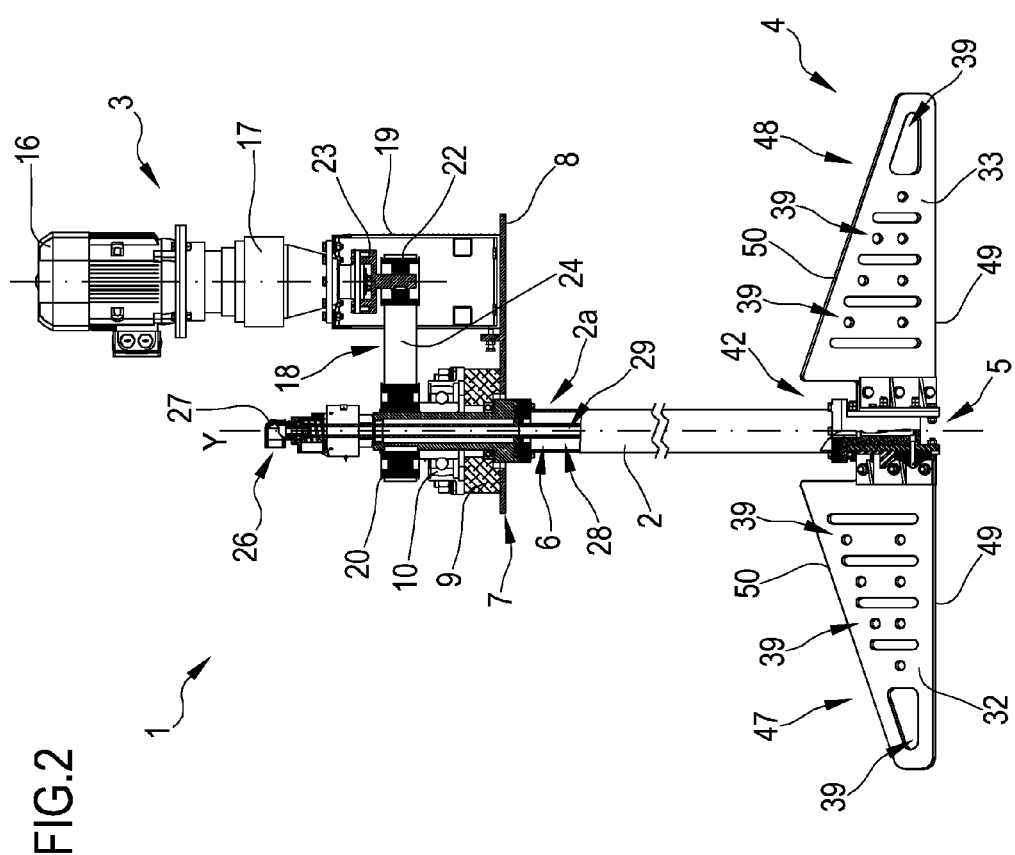
FIG. 2 is a longitudinal section view of the stirrer of FIG. 1.
Figure 4:
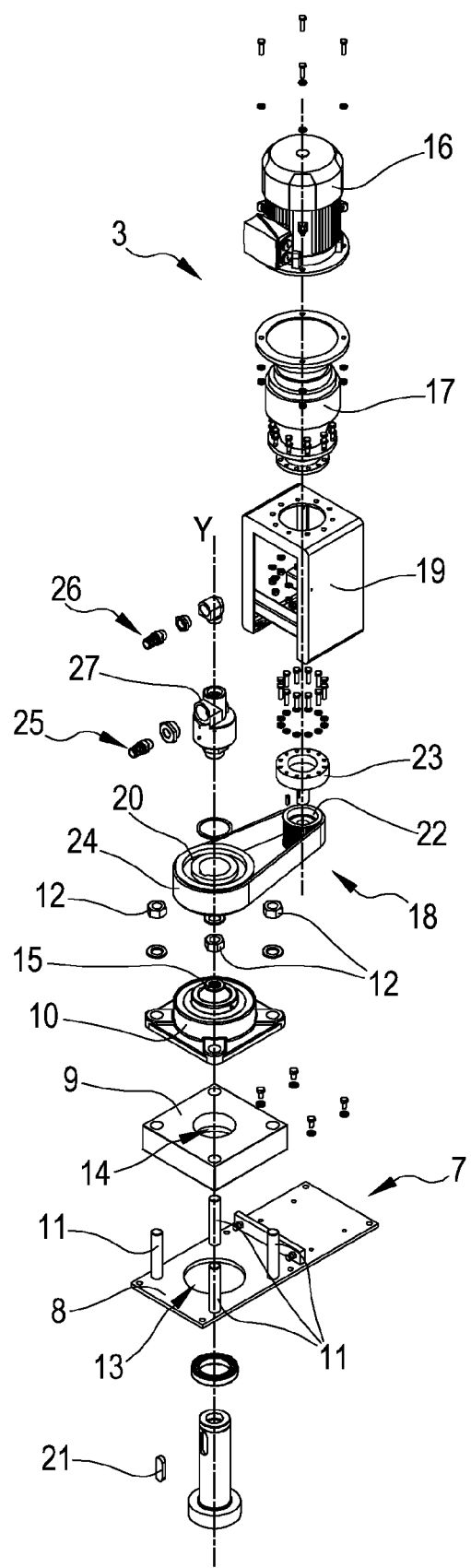
FIG. 4 is an exploded assonometric view of a first constructive assembly of the stirrer of FIG. 1.

Referring to the thermoregulation circuit 6, FIG. 1 and partly also FIGS. 2 and 3 show that it includes an inlet 25 and an outlet 26 adapted to be connected with the external source for supplying the heat transfer fluid through, respectively, a delivery pipe and a return pipe, not shown for simplicity but anyway of the flexible type and commonly known to the person skilled in the art.

In any case, the inlet 25 and the outlet 26 of the thermoregulation circuit 6 protrude outwardly from the support shaft 2 in such a manner as to be external to the mixing tank V and be easily accessible for the connection/disconnection of the delivery and return pipes which, together with the external source, close the thermoregulation circuit 6.

In a preferred but not binding way, the inlet 25 and the outlet 26 of the thermoregulation circuit 6 belong to a rotating joint 27 coupled through engaging means, not shown, with the support shaft 2 at a first end 2a which remains outside the mixing tank V and, in this case, also the box-shaped casing 19.

According to the preferred embodiment of the invention described herein, the thermoregulation circuit 6 is composed of:

a first conduit 28, contained into the support shaft 2 and communicating with the inlet 25, suitable to be crossed by the heat transfer fluid along a predetermined first direction, indicated by the arrow $F_1$ in FIG. 1;

a second conduit 29, which is also contained into the support shaft 2 and communicating with the outlet 26, suitable to be crossed by the heat transfer fluid along a predetermined second direction, indicated by $F_2$ and contrary to the first direction $F_1$ so that the heat transfer fluid circulates in countercurrent the first conduit 28 and second conduit 29;

two branch coils 30, 31, embedded and integrated in two respective and distinct constructive sections 32, 33 in which it is possible to divide the main operating blade 4: each of the branch coils 30, 31 is provided with an inlet fitting 34 communicating with an outlet opening 35 of the first conduit 28 and with an outlet fitting 36 communicating with the inlet opening 37 of the second conduit 29.

In essence, then, the first conduit 28 and second conduit 29 are coaxial each other and with the support shaft 2 along the longitudinal rotation axis Y defined by the latter.

Figure 5:
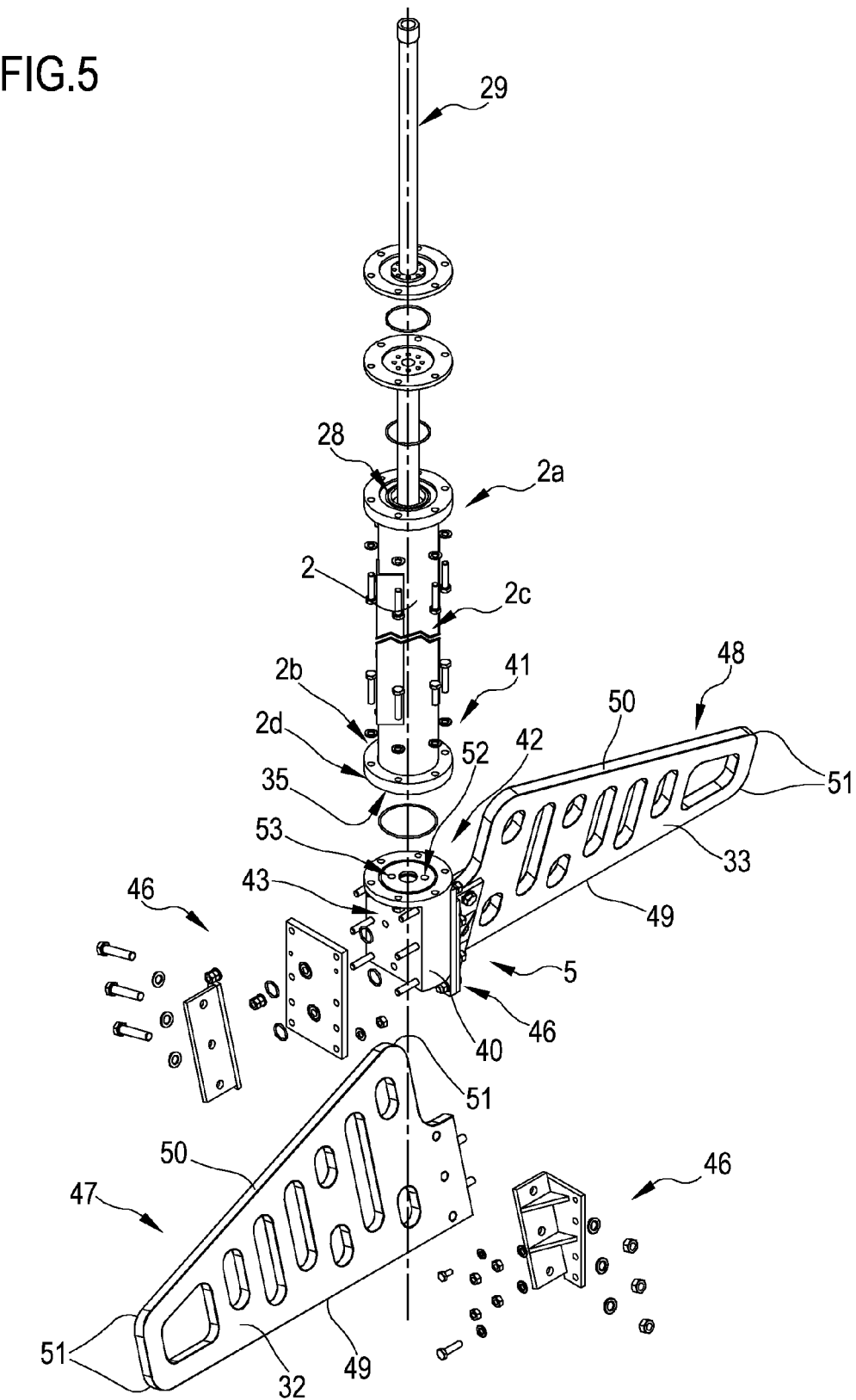
FIG. 5 is a partly exploded assonometric view of a second constructive assembly of the stirrer of FIG. 1.
Figure 6:
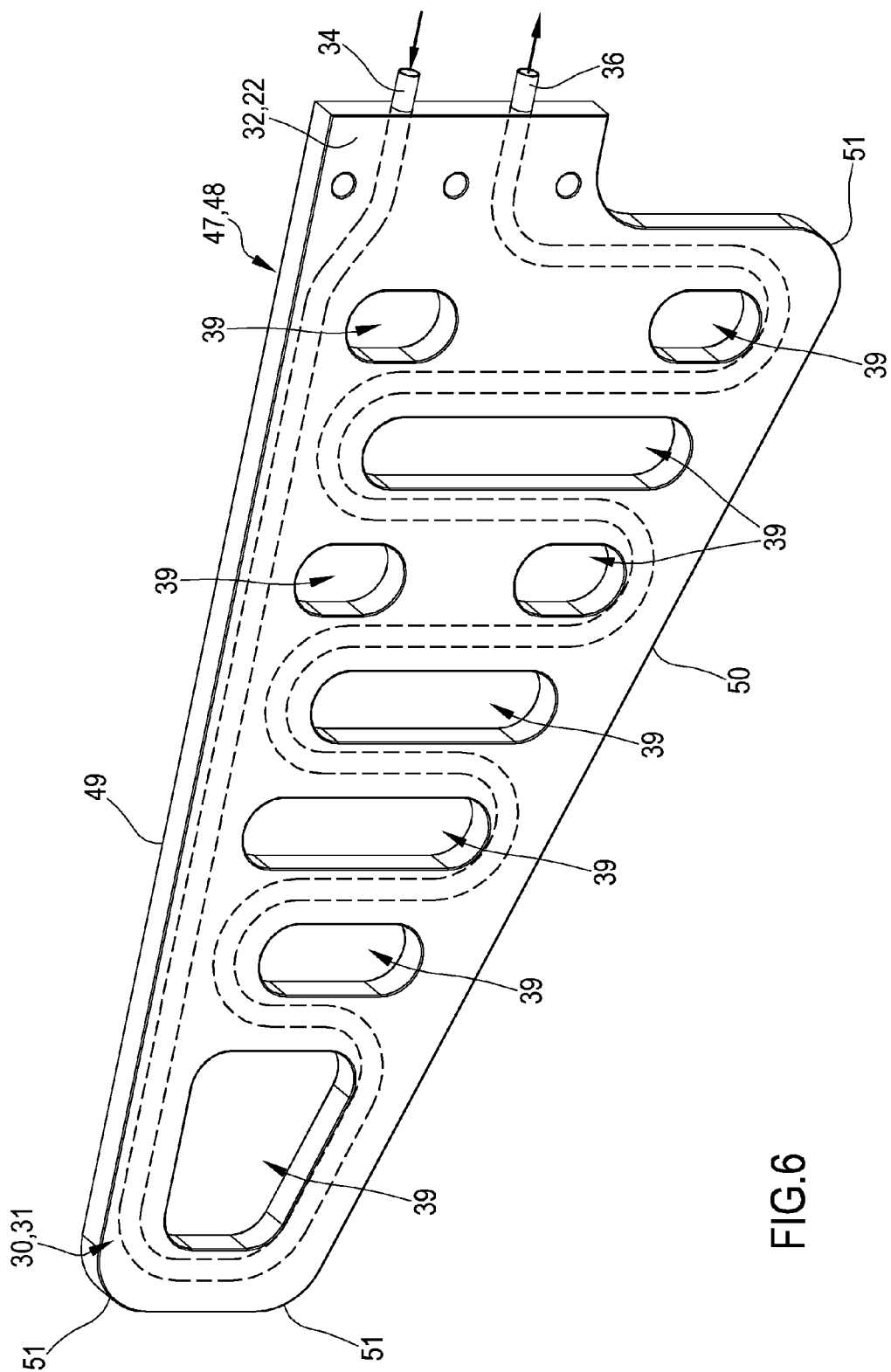
FIG. 6 is an enlarged assonometric view of a construction particular of FIG. 5.

The branch coils 30, 31 are equal each other, when considered apart, while when coupled to the main operating blade 4 are symmetrically and inversely arranged opposite each other: for this reason, they are visible simultaneously in the same figure only in partial way in FIG. 1, while they are visible apart in a single exemplar in FIG. 6 where the branch coil 30, 31 is represented with a dashed line because it does not in view. The outlet opening 35 of the first conduit 28 and the inlet opening 37 of the second conduit 29 are clearly better visible in FIG. 5.

It is understood that in other embodiments of the stirrer of the invention, not shown in the drawings that follow, the thermoregulation circuit could comprise a single branch coil, embedded only in a very precise and limited constructive section of the main operating blade or uniformly distributed along the entire surface development or extension of the blade itself.

As shown again in FIG. 1, the support shaft 2 comprises a shaped collar 38 surrounding the outer wall 2c thereof and developing substantially for the entire axial length of the support shaft 2 itself: the shaped collar 38 (having for instance a substantially rhombus-shaped profile in top view) has the function of increasing the handling capacity of the liquid binding unfinished product by the support shaft 2 in rotation and avoiding harmful turbulence effects of the outer wall 2c of the support shaft 2, otherwise determined by the chemical aggressiveness of the liquid binding unfinished product.

With reference now to the main operating blade 4, FIGS. 1-3 and 5 illustrate how it protrudes laterally from the support shaft 2 and is arranged at a second end 2b thereof which, in application conditions of the stirrer 1 of the invention, faces the bottom F of the mixing tank V.

More in detail, the main operating blade 4 is oriented along a plane inclined with respect to a hypothetical vertical plane, which it defines an acute angle with, in order to facilitate disposal, outflow, sliding or slipping of the liquid binding unfinished product which the operating blade 4 interferes with during the rotation of the support shaft 2 imparted by the motorization means 3 firstly introduced.

In addition, the aforesaid figures as well as FIG. 6 emphasize that the main operating blade 4 presents a plurality of through lightening holes 39, interposed between the articulated and tortuous sections of the branch coils 30, 31, which also contribute to promote the disposal, outflow or sliding of the liquid binding unfinished product which the operating blade interferes 4 with during the rotation of the support shaft 2 imparted by the motorization means 3.

Figure 8:
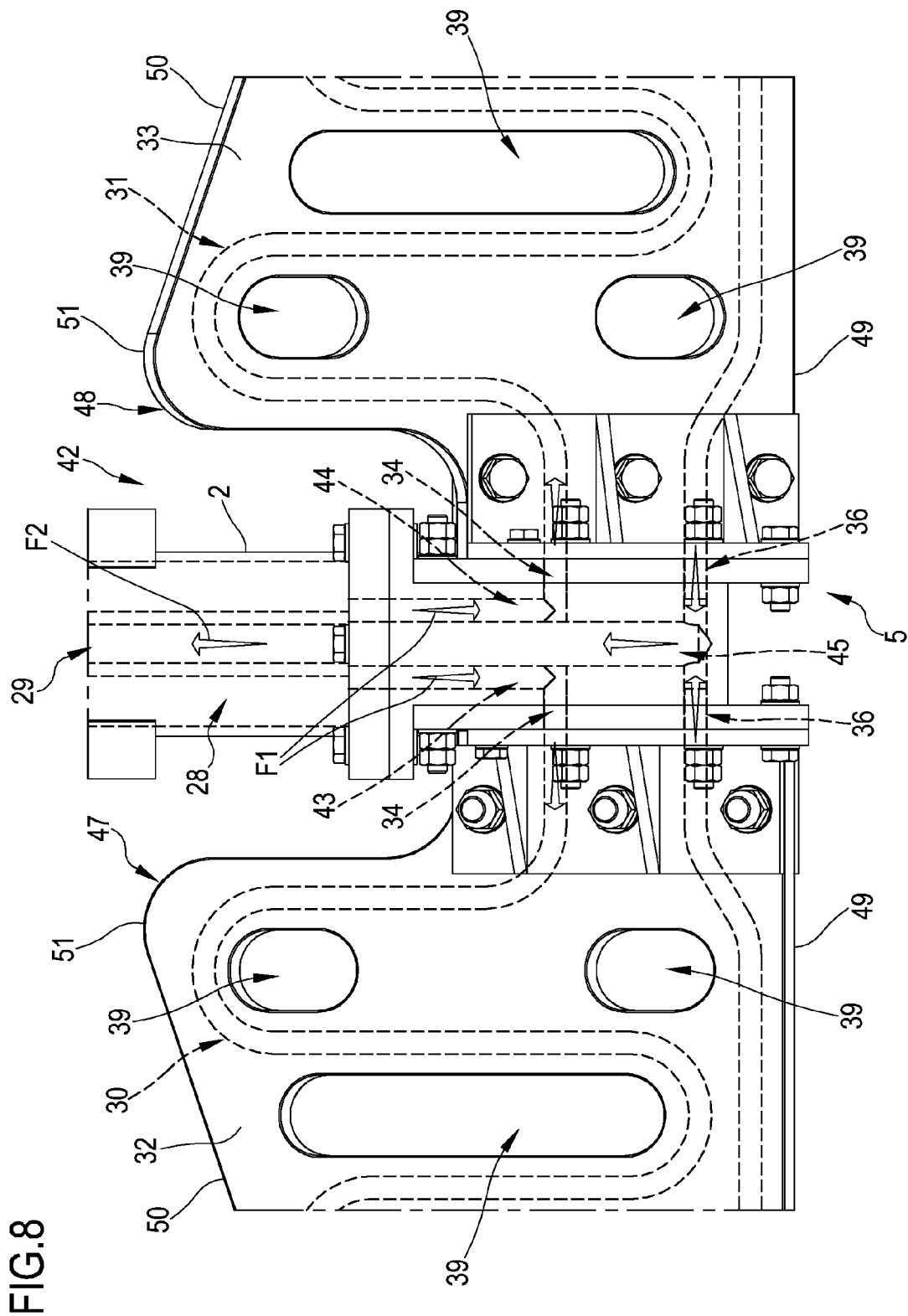
FIG. 8 is a side truncated view of the stirrer of FIG. 1 which schematizes the path of the thermoregulation, conditioning or heat exchange heat transfer fluid in the lower part of the stirrer itself.

By way of indicative but not limiting example, the interconnection means 5 comprise a distribution block 40 which, as shown in FIG. 5:

is connected with the support shaft 2, which is firmly coupled with through first fastening means, generally indicated with 41, in such a manner as to axially protrude from the lower perimetrical edge 2d of the hollow support shaft 2;

is associated with the main operating blade 4 at a central depression 42;

presents in this case a pair of through inner channels 43, 44, better seen in FIG. 8, each of which communicating on one side with the outlet opening 35 of the first conduit 28 and on the other side with the inlet fitting 34 of the branch coils 30, 31, and a through axial channel 45 communicating on one side with the outlet fitting 36 of the branch coils 30, 31 and on the other side with the inlet opening 37 of the second conduit 29.

In particular, the distribution block 40 is in this case a piece separate from the main operating blade 4 which is coupled with through second fastening means, as a whole numbered with 46, always well visible in FIG. 5 and of the type per se known.

In alternative embodiments of the stirrer of the invention, not shown in the attached drawings, the distribution block could be made in a single piece, monolithic, with the main operating blade, whose constructive sections could be thus only hypothetically distinguished each other but not materially and physically separated each other as for the example of preferred embodiment described with the aid of the FIGS. 1-8 attached.

Further constructive solutions of the stirrer of the invention, also in this case devoid of explanatory drawings annexed, the distribution block of the interconnection means could present a single through inner channel, communicating on one side with the outlet opening of the first conduit and on the other side with the inlet fitting of the only one branch coil in that case provided.

FIG. 5 shows that, in preferred and advantageous, but not essential, way the main operating blade 4 is composed of two semi-shaped blades 47, 48 equal and distinct each other, symmetrically arranged with respect to the longitudinal rotation axis Y along planes that converge and imaginarily intersect each other below the semi-shaped blades 47, 48.

Each of these semi-shaped blades 47, 48 is firmly coupled with the distribution block 40 through the aforesaid second fastening means 46.

In addition, at preferential but not exclusive title, each of the semi-shaped blades 47, 48 of the main operating blade 4 presents a composite profile which includes a substantially horizontal linear stretch 49 suitable to allow the use of the operating blade 4 in a mixing tank V having a flat bottom F, as in the specific example of the solution of FIGS. 1-8 (in this case the mixing tank V will be provided in the flat bottom F of two spaced apart discharges used for sorting the liquid binding unfinished product).

Figure 9:
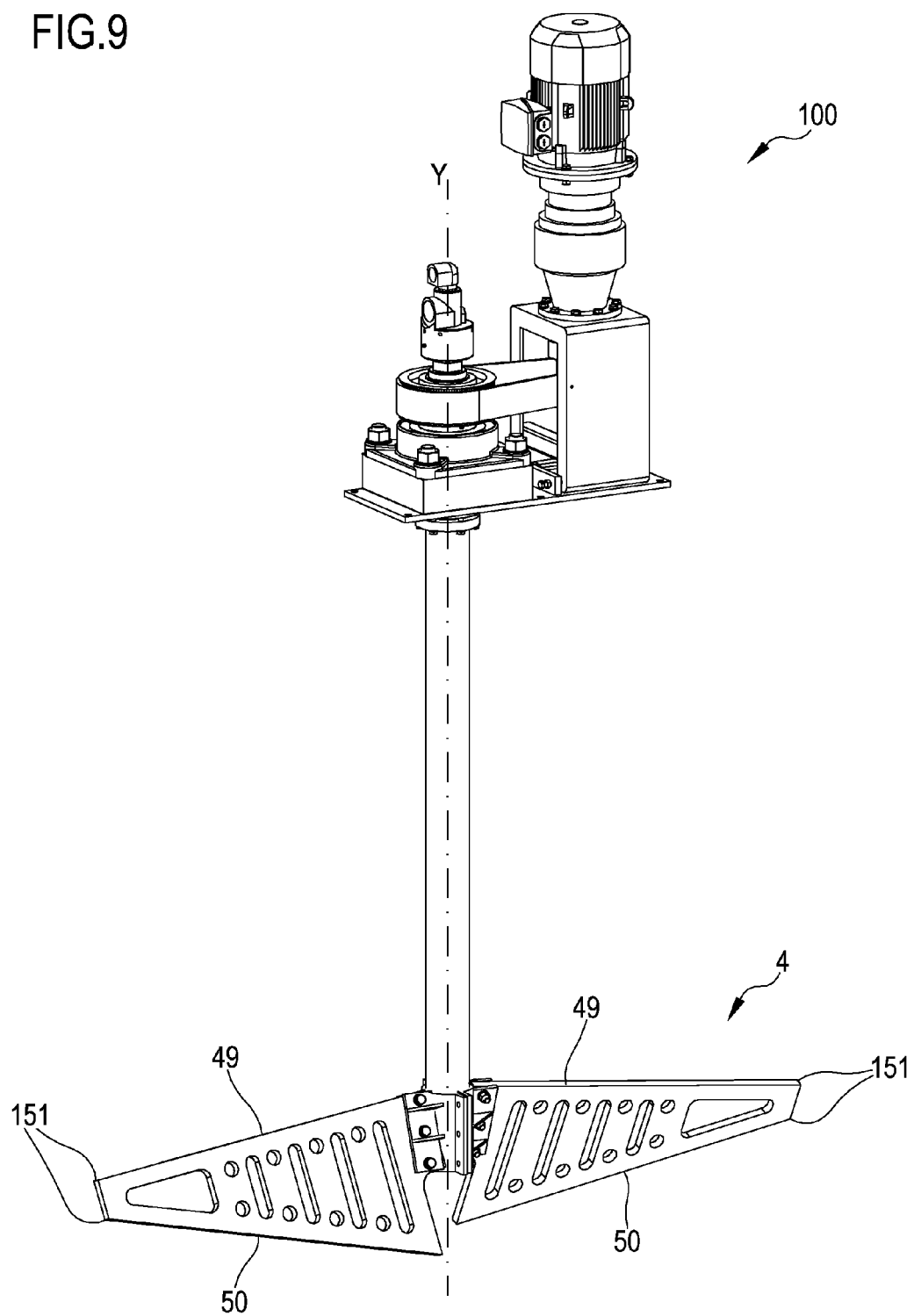
FIG. 9 is an assonometric view of another embodiment of the stirrer of FIG. 1.
Figure 10:
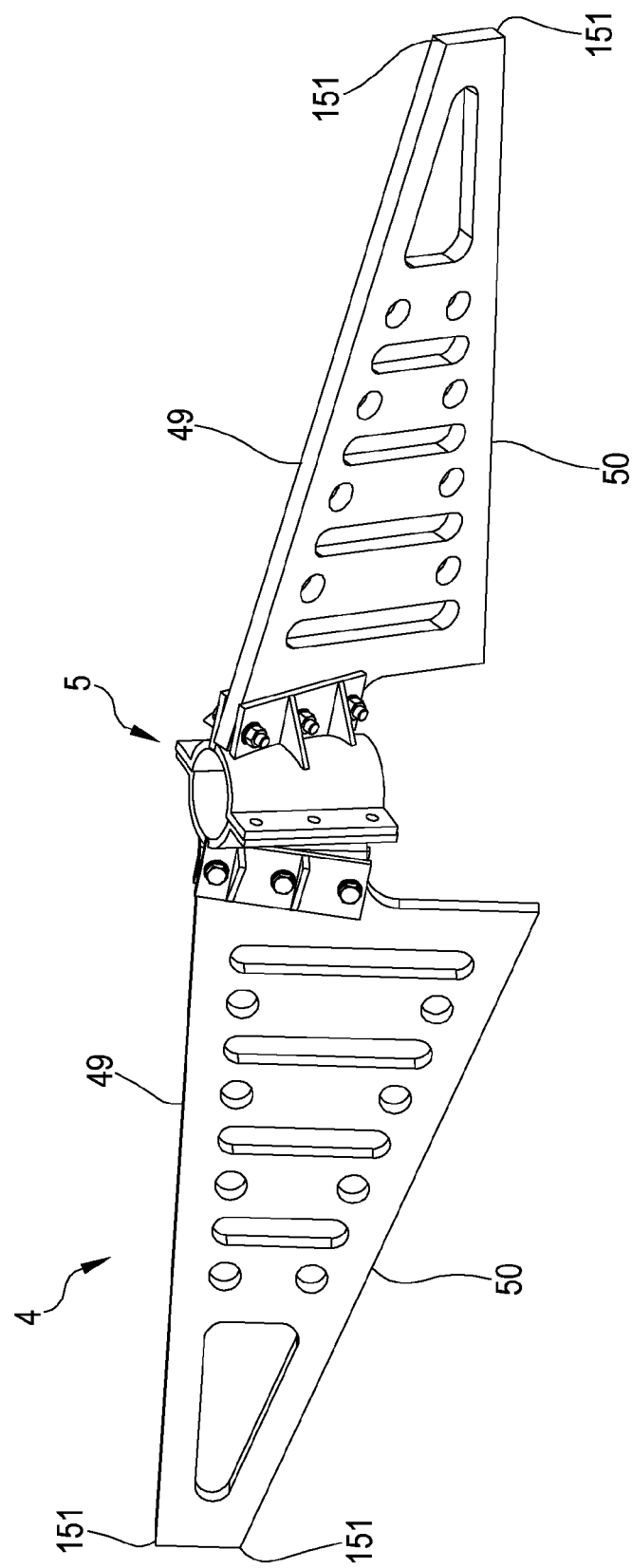
FIG. 10 is an assonometric view of a constructive particular of FIG. 9.

The composite profile of the main operating blade 4 also includes an oblique linear stretch 50 which slopes downwardly from the longitudinal axis Y and allows the use of the operating blade 4 itself in a mixing tank V having a conical or tapered bottom so that operating blade 4 assumes the operative configuration of FIGS. 9 and 10 which illustrate an alternative embodiment of the stirrer of the invention, now generally indicated with 100: it should be noted as the main operating blade 4 is oriented in the inverted position of a flat angle with respect to the position that it assumes in FIGS. 1-8.

It is state precisely that the mixing tank which the stirrer 100 of the invention intended to will be equipped in the conical or tapered bottom with a single central discharge of the liquid binding unfinished product.

As still FIGS. 1-8 illustrate, the linear sections 49, 50 of the composite profile of the main operating blade 4 of the stirrer 100 are connected each other by smoothed edges 51: this in order to extremely ease disposal or sliding of the liquid binding unfinished product on the main operating blade 4.

FIGS. 9 and 10 show, instead, that the linear stretches 49, 50 of the composite profile of the main operating blade 4 of the stirrer 100 are joined together by sharp edges 151: this solution seems clearly preferable in the case where, during design phase, it is opted for an increase of the disposal surface of the liquid binding unfinished product, more than for a higher speed of disposal of the latter by the main operating blade 4.

In other embodiments of the invention, not shown, the stirrer could also include one or more auxiliary operating blades, each of which made integral with the support shaft through union means, preferably of the same type of the interconnection means, in such a way as:

to be substantially associated with the intermediate portion of the support shaft and above the main operating blade itself, and to be still contained into the mixing tank in order to interfere, similarly to the main operating blade, with the liquid binding unfinished product and cause a continuous mechanical mixing action thereof inside the mixing tank when the support shaft rotates around the longitudinal axis.

More specifically, the stirrer could comprise a plurality of auxiliary operating blades spaced apart each other along the longitudinal axis of the support shaft, (in likely, but not limiting, way in number of two), the thermoregulation circuit extending inside at least a part of at least one of these auxiliary operating blades.

To summarize, according to the outcome of the structural features described above, the stirrer of the invention will then be available in the following variants of its components;

support shaft and main operating blade provided with thermoregulation circuit;

support shaft and main operating blade provided with thermoregulation circuit, an auxiliary operating blade of simple mechanical handling of the liquid binding unfinished product to increase the flow thereof;

support shaft and main operating blade provided with thermoregulation circuit, an auxiliary operating blade of simple mechanical handling of the liquid binding unfinished product to increase the thrust thereof towards the main operating blade (this solution differs from the previous one as far as the mutual arrangement of the semi-shaped blades is concerned);

support shaft and main operating blade provided with thermoregulation circuit and one auxiliary operating blade also complete with thermoregulation circuit;

support shaft and main operating blade provided with thermoregulation circuit and a plurality of auxiliary operating blades having only a mechanical function (to increase the liquid binding unfinished product flow or downward thrust, depending on the case);

support shaft and main operating blade provided with thermoregulation circuits and a plurality of auxiliary operating blades, at least one of which provided with a thermoregulation circuit.

From an operational point of view, the stirrer 1 of the present invention is fixed by the anchoring means 7 to the cover C of the mixing tank V in such a way that the motorization means 3, the transmission means 18, the first end 2a of the support shaft 2 protrude upwardly from the mixing tank V and are easily accessible to the operator for their maintenance and/or replacement, with the foresight, however, that, during normal operation or periodic stop phases of the stirrer 1, the transmission means 18 remain protected and inaccessible due to the presence of the box-shaped casing 19.

The main operating blade 4 is thus disposed near the flat bottom F of the mixing tank V, slightly spaced apart from this while the hollow support shaft 2 extends along the inner central zone and for the whole remaining part of the length of the mixing tank V.

Subsequently, the operator fastens the delivery pipe and the return pipe from one side, respectively to the inlet 25 and the outlet 26 of the rotary joint 27 and, on the other side, to the external source of supply of the heat transfer fluid, usually water.

In order to perform the thermo-mechanical processing of the liquid binding unfinished product present in the mixing tank V, a dedicated central processing unit and control, belonging to a control panel installed for example on the body of the mixing tank V, actuates the motorization means 3 which, through the transmission means 19, rotate the support shaft 2 around the longitudinal axis Y, together with the rotary joint 27 and the main operating blade 4.

Figure 7:
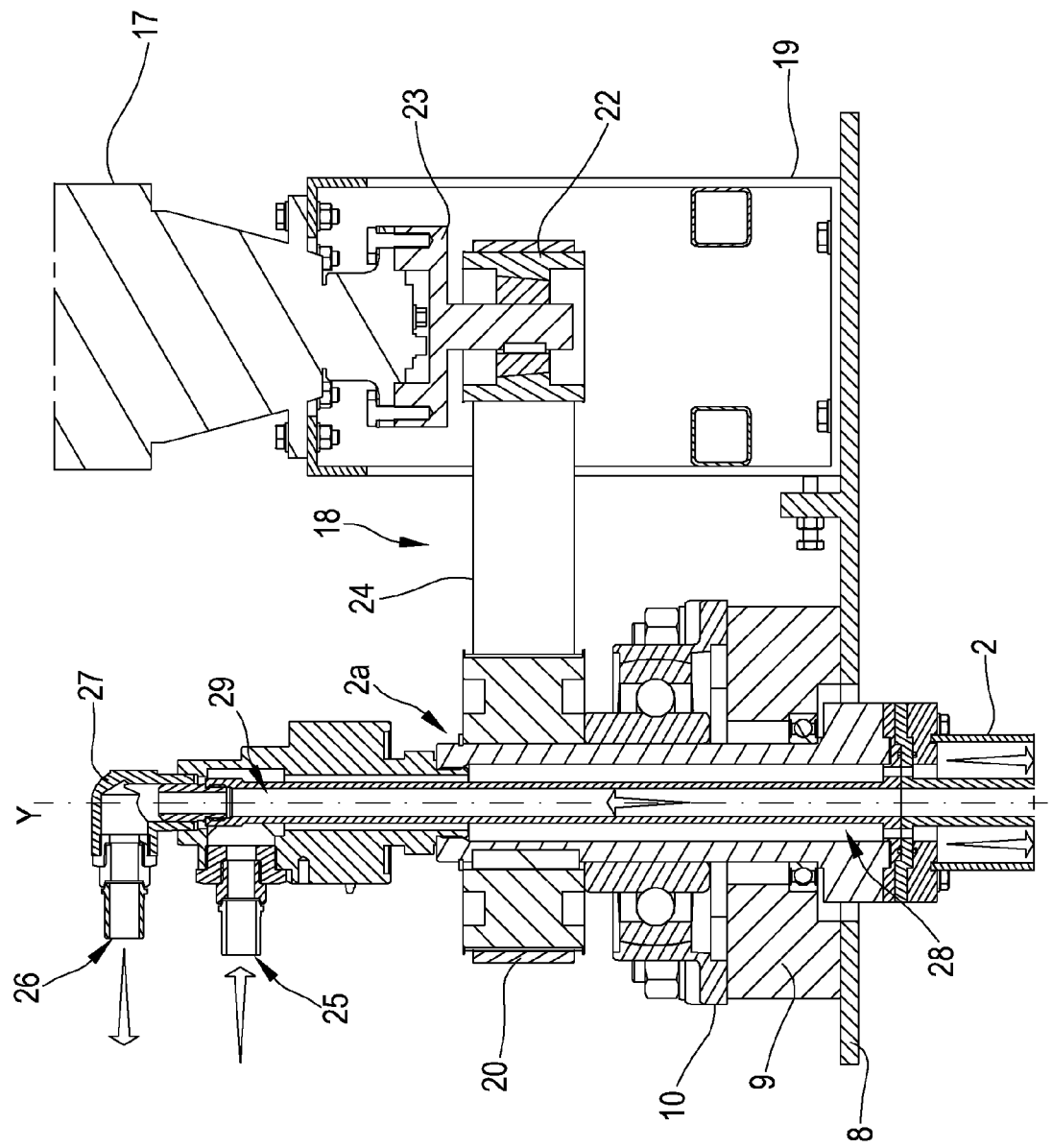
FIG. 7 is a sectioned truncated view of the stirrer of FIG. 1 which schematizes the path of the thermoregulation conditioning or heat exchange heat transfer fluid at the upper part of the stirrer itself.

At the same time, the heat transfer fluid is made circulating inside the thermoregulation circuit 6: in this case, the heat transfer fluid enters the rotary joint 27 through the inlet 25 and from here flows downwardly through the first conduit 28 in the direction of the arrow $F_1$ shown in FIG. 1 and, with more detail, in FIG. 7.

Reached the end of the support shaft 2, the heat transfer fluid firstly enters the through inner channels 43, 44 of the distribution block 40 of the interconnection means 5, passing through the outlet opening 35 of the first conduit 28 and the diametrically opposite orifices 52, 53 made in the upper wall of the distribution block 40.

The heat transfer fluid enters subsequently in the inlet fitting 34 of the two branch coils 30, 31 integrated in the respective constructive sections 32, 33 (or semi-shaped blades 47, 48) of the main operating blade 4.

In doing so, the heat transfer fluid flows through the articulated path of the branch coils 30, 31, exchanging heat with the liquid binding unfinished product of the mixing tank V (until the latter reaches the desired level of temperature) and escapes from opposite sides from the branch coils 30, 31 through the respective outlet fitting 36 that conveys it, passing through the inlet opening 37, into the second conduit 29, arranged coaxially inside the first conduit 28.

The heat transfer fluid then goes back the second conduit 29 along the direction indicated by the arrow $F_2$ in FIG. 1 and in greater detail in FIG. 8, i.e. in countercurrent with respect to the direction $F_1$ along which crosses the first conduit 28 and, passing through the outlet 26 of the rotary joint 27, as still well shown in FIGS. 1 and 8 escapes the support shaft 2 of the stirrer 1 of the invention to enter the delivery pipe and from here, the external power source where it is recirculated.

It follows that the stirrer 1 of the present invention provides for the passage of a heat transfer fluid within the components in motion, i.e. the support shaft 2 and main operating blade 4, with the obvious advantages that this entails and which have already been widely highlighted in the course of the description presented herein.

The same components (support shaft 2 and main operating blade 4) that perform the mechanical action on the liquid binding unfinished product are also involved in the thermal processing of the latter, thanks to the fact to integrate within them the thermoregulation circuit 6.

The operation of the stirrer 100 of FIGS. 9 and 10 is completely equivalent to that one just outlined for the stirrer 1; moreover, it is confirmed that the stirrer 100 differs from the stirrer 1 only for the spatial arrangement or orientation of the main operating blade 4, which makes the stirrer 100 suitable to be installed in mixing tanks having conical or tapered towards the centre bottom.

On the basis of the description just given, it is understood, therefore, that the stirrer for stabilizing liquid binding unfinished product intended to form ceramic items, which is the object of the present invention, achieves the purposes and reaches the advantages mentioned above.

The stirrer for stabilizing liquid binding unfinished product intended to form sanitary items also presents the advantage of being adaptable to yet existing mixing tanks, not necessarily new and manufactured together with it, since the essential components of the innovative stirrer here proposed by the applicant can be fixed and fixed to the cover of a given mixing tank and do not provide interventions on the inner parts of the latter for its installation.

The adaptability of the stirrer of the invention allows its application also to mixing tanks of volumetric capacity mutually different, thanks to an adaptation of the length of the support shaft (for example through tubular extensions) or to the replacement of only the support shaft with another one of length adequate to the new application.

The absence of bulky static thermoregulation circuits, as well as their direct installation/application to the support shaft and main operating blade, make the equipment as a whole, formed as said by stirrer and mixing tank, rather economic.

In execution phase, changes could be made to the stirrer for stabilizing liquid binding unfinished products intended to form ceramic items, object of the invention, consisting, for example, in motorization means different from those ones summarily and indicatively described during the previous description and which in any case can be deduced in rather detailed way by the accompanying figures.

Moreover, other embodiments of the stirrer of the invention, not shown, could provide that the support shaft is only partly contained into the mixing tank of the liquid binding unfinished product.

In addition, in further embodiments of the stirrer herein claimed as exclusive title of industrial property, the main operating blade and any optional auxiliary operating blades could be coupled with the support shaft by means, respectively, of interconnection means and union means different from those ones described above, which does riot affect the advantage brought by the present invention It is also underlined that the stirrer of the invention could be used for processing any liquid binding unfinished product to be used in the composition of sanitary fixtures, and therefore not only for a mixture of water and clays, but also for enamels, paints and so on.

It is, finally, clear that several other changes could be made to the stirrer concerned, without departing from the principle of novelty intrinsic in the inventive idea expressed herein, as it is clear that, in the practical implementation of the invention, materials, shapes and sizes of the illustrated details could be changed, as needed, and replaced with others technically equivalent.

Where the constructive features and techniques mentioned in the following claims are followed by reference numbers or signs, those reference signs have been introduced with the sole objective of increasing the intelligibility of the claims themselves and therefore they have no limiting effect on the interpretation of each element identified, by way of example only, by these reference signs.

The invention claimed is:

1. Stirrer (1; 100) for stabilizing liquid binding unfinished products intended to form ceramic items comprising:
   a support shaft (2) individuating a longitudinal rotation axis (Y) and suitable to be at least partly contained into a mixing tank (V) of said liquid binding unfinished product;
   motorization means (3) operatively connected with said support shaft (2) in order to rotate it around said longitudinal axis (Y);
   a main operating blade (4), coupled with said support shaft (2) through interconnection means (5) in such a way as to be contained into said mixing tank (V) in order to interfere with said liquid binding unfinished product and cause a continuous mechanical mixing action thereof when said support shaft (2) rotates around said longitudinal axis (Y);
   a thermoregulation circuit (6), which extends inside said support shaft (2) and inside at least a part of said main operating blade (4) and is connected with an external source for supplying a heat transfer fluid suitable to cross said thermoregulation circuit (6) in such a way as to exchange heat with said liquid binding unfinished product inside said mixing tank (V), in order to bring said liquid binding unfinished product to a predefined temperature, while said support shaft (2) and said main operating blade (4) rotate around said longitudinal axis (Y), wherein said thermoregulation circuit (6) includes an inlet (25) and an outlet (26) suitable to be connected with said external source for supplying said heat transfer fluid through, respectively, a delivery pipe and a return pipe, and is composed of:
   a first conduit (28), contained into said support shaft (2) and communicating with said inlet (25), suitable to be crossed by said heat transfer fluid along a predetermined first direction ($F_1$);
   a second conduit (29), contained into said support shaft (2) and communicating with said outlet (26), suitable to be crossed by said heat transfer fluid along a second predetermined direction ($F_2$) opposite to said first direction ($F_1$) in such a way that said heat transfer fluid circulates in countercurrent into said first and second conduit (28, 29);
   at least one branch coil (30, 31), embedded in at least a construction section (32, 33) of said main operating blade (4) and provided with an inlet fitting (34) communicating with the outlet opening (35) of said first conduit (28) and with an outlet fitting (36) communicating with the inlet opening (37) of said second conduit (29), and wherein said interconnection means (5) include a distribution block (40) which:
   is connected with said support shaft (2), which is firmly coupled with through first fastening means (41) in such a manner as to axially protrude from the lower perimetrical edge (2d) of said support shaft (2);

is associated with said main operating blade (4) at a central depression (42);

has at least one through inner channel (43, 44), communicating on one side with said outlet opening (35) of said first conduit (28) and on the other side with said inlet fitting (34) of said branch coil (30, 31), and a through axial channel (45) communicating on one side with said outlet fitting (36) of said branch coil (30, 31) and on the other side with said inlet opening (37) of said second conduit (29);

characterized in that said main operating blade (4) is composed of two semi-shaped blades (47, 48) equal and distinct each other, symmetrically arranged with respect to said longitudinal rotation axis (Y) along planes convergent and imaginarily intersecting each other at the bottom of said semi-shaped blades (47, 48), each of said semi-shaped blades (47, 48) being firmly coupled with said distribution block (40) through second fastening means (46).

2. Stirrer (1; 100) according to claim 1 characterized in that said motorization means (3) are operatively connected with said support shaft (2) through transmission means (18) suitable to be arranged superiorly outside said mixing tank (V).

3. Stirrer (1; 100) according to claim 2 characterized in that said transmission means (18) include a first toothed pulley (20), coupled with said support shaft (2) through a locking key (21), and a second toothed pulley (22) coupled with a drive shaft (23) of said motorization means (3) and mechanically connected with said first toothed pulley (20) by means of a toothed belt (24).

4. Stirrer (1; 100) according to claim 1 characterized in that said inlet (25) and said outlet (26) of said thermoregulation circuit (6) protrude outwardly from said support shaft (2) in such a manner to be external to said mixing tank (V).

5. Stirrer (1; 100) according to claim 1 characterized in that said inlet (25) and said outlet (26) of said thermoregulation circuit (6) belong to a rotating joint (27) coupled with said support shaft (2) at a first end (2a) suitable to remain outside said mixing tank (V).

6. Stirrer (1; 100) according to claim 1 characterized in that said first conduit (28) and said second conduit (29) of said thermoregulation circuit (6) are coaxial with each other and with said support shaft (2) along said longitudinal rotation axis (Y) defined by said support shaft (2).

7. Stirrer (1; 100) according to claim 1 characterized in that said support shaft (2) comprises a shaped collar (38), which surrounds the outer wall (2c) of said support shaft (2) and develops substantially for the entire axial length of said support shaft (2), suitable to increase the handling capacity of said liquid binding unfinished product by said support shaft (2) in rotation and to avoid harmful turbulence effects of said outer wall (2c) of said support shaft (2) caused by the chemical aggressiveness of said liquid binding unfinished product.

8. Stirrer (1; 100) according to claim 1 characterized in that said main operating blade (4) projects laterally from said support shaft (2) and is arranged at a second end (2b) of said support shaft (2), said second end (2b) being suitable to face the bottom (F) of said mixing tank (V).

9. Stirrer (1; 100) according to claim 1 characterized in that said main operating blade (4) is oriented along a plane inclined with respect to a hypothetical vertical plane, which it defines an acute angle with, in order to facilitate disposal, outflow or sliding of said liquid binding unfinished product which said operating blade (4) interferes with during the rotation of said support shaft (2) imparted by said motorization means (3).

10. Stirrer (1; 100) according to claim 1 characterized in that said main operating blade (4) has a plurality of through lightening holes (39), interposed between the articulated sections of said branch coil (30, 31), suitable to ease disposal, outflow or sliding of said liquid binding unfinished product which said operating blade (4) interferes with during the rotation of said support shaft (2) imparted by said motorization means (3).

11. Stirrer (1; 100) according to claim 1 characterized in that said distribution block (40) is a piece separated from said main operating blade (4) which is coupled with through second fastening means (46).

12. Stirrer according to claim 1 characterized in that said distribution block is made in a single piece, monolithic, with said main operating blade.

13. Stirrer (1; 100) according to claim 1 characterized in that each of said semi-shaped blades of said main operating blade (4) presents a composite profile which includes a substantially horizontal linear stretch (49) suitable to allow the use of said operating blade (4) in presence of a flat bottom (F) for said mixing tank (V), and an oblique linear stretch (50), sloping downwardly from said longitudinal axis (Y), suitable to allow the use of said operating blade (4) in presence of a conical or tapered bottom of said mixing tank.

14. Stirrer according to claim 1 characterized in that it comprises one or more auxiliary operating blades, each of which coupled through union means with said support shaft in such a way as to be substantially associated with the intermediate portion of said support shaft and above said main operating blade and to be still contained into said mixing tank in order to interfere with said liquid binding unfinished product and cause a continuous mechanical mixing action thereof inside said mixing tank when said support shaft rotates around said longitudinal axis.

15. Stirrer according to claim 14 characterized in that it comprises a plurality of said auxiliary operating blades, said thermoregulation circuit extending within at least a part of at least one of said auxiliary operating blades.

\* \* \* \* \*